(12) United States Patent
Chen et al.

(10) Patent No.: US 12,682,528 B2
(45) Date of Patent: Jul. 14, 2026

(54) VIDEO PROCESSING METHOD, VIDEO PROCESSING APPARATUS, AND STORAGE MEDIUM

(71) Applicant: BYTEDANCE INC., Los Angeles, CA (US)

(72) Inventors: Zhili Chen, Los Angeles, CA (US); Linjie Luo, Los Angeles, CA (US); Jianchao Yang, Los Angeles, CA (US); Guohui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 289 days.

(21) Appl. No.: 18/251,182

(22) PCT Filed: Aug. 4, 2021

(86) PCT No.: PCT/CN2021/110560
§ 371 (c)(1),
(2) Date: Apr. 28, 2023

(87) PCT Pub. No.: WO2022/088819
PCT Pub. Date: May 5, 2022

(65) Prior Publication Data
US 2024/0331245 A1 Oct. 3, 2024

(30) Foreign Application Priority Data

Oct. 29, 2020 (CN) .......................... 202011177198.2

(51) Int. Cl.
*G06T 13/20* (2011.01)
*G06T 7/246* (2017.01)
(Continued)

(52) U.S. Cl.
CPC .............. *G06T 13/20* (2013.01); *G06T 7/246* (2017.01); *G06T 7/73* (2017.01); *G06V 10/75* (2022.01);
(Continued)

(58) Field of Classification Search
CPC ........... G06T 13/20; G06T 7/246; G06T 7/73; G06T 2207/10016; G06T 2207/20084;
(Continued)

(56) References Cited

U.S. PATENT DOCUMENTS 10,620,713 B1 4/2020 Ng et al.
2014/0320397 A1* 10/2014 Hennessey .............. G06F 3/013
345/156
(Continued)

FOREIGN PATENT DOCUMENTS

CN 103956128 A 7/2014
CN 107610041 A 1/2018
(Continued)

OTHER PUBLICATIONS

International Search Report issued Nov. 3, 2021 in International Application No. PCT/CN2021/110560, with English translation (6 pages).
(Continued)

*Primary Examiner* — Jin Cheng Wang

(57) ABSTRACT

The present disclosure provides a video processing method, a video processing apparatus, and a storage medium. A picture of the video includes a landmark building and a moving subject. The video processing method includes: identifying and tracking the landmark building in the video; extracting and tracking a key point of the moving subject in the video, and determining a posture of the moving subject based on information of the extracted key point of the moving subject; and making the key point of the moving
(Continued)

subject correspond to the landmark building, and driving the landmark building to perform a corresponding action based on an action of the key point of the moving subject, so as to make a posture of the landmark building in the picture of the video correspond to the posture of the moving subject. The video processing method may enhance interactions between the user and the shot landmark.

18 Claims, 5 Drawing Sheets

(51) Int. Cl.

| | |
|---|---|
| *G06T 7/73* | (2017.01) |
| *G06V 10/75* | (2022.01) |
| *G06V 10/82* | (2022.01) |
| *G06V 20/10* | (2022.01) |
| *G06V 20/40* | (2022.01) |
| *G06V 40/10* | (2022.01) |

(52) U.S. Cl.
CPC ............ *G06V 10/82* (2022.01); *G06V 20/176* (2022.01); *G06V 20/41* (2022.01); *G06V 20/46* (2022.01); *G06V 20/49* (2022.01); *G06V 40/10* (2022.01); *G06T 2207/10016* (2013.01); *G06T 2207/20084* (2013.01); *G06T 2207/30184* (2013.01); *G06T 2207/30196* (2013.01)

(58) Field of Classification Search
CPC . G06T 2207/30184; G06T 2207/30196; G06T 19/006; G06V 10/75; G06V 10/82; G06V 20/176; G06V 20/41; G06V 20/46; G06V 20/49; G06V 40/10; G06V 40/23; G06V 20/39
See application file for complete search history.

(56) References Cited

U.S. PATENT DOCUMENTS

| | | | | |
|---|---|---|---|---|
| 2018/0005015 | A1 | 1/2018 | Hou et al. | |
| 2019/0347826 | A1 | 11/2019 | Zhang et al. | |
| 2020/0082635 | A1* | 3/2020 | Zhu | G06T 7/248 |
| 2020/0109954 | A1* | 4/2020 | Li | G01C 21/3848 |
| 2020/0302162 | A1 | 9/2020 | Lin | |
| 2021/0199788 | A1* | 7/2021 | Emadi | G01S 13/42 |
| 2021/0337137 | A1* | 10/2021 | Wang | H04N 5/272 |
| 2021/0397202 | A1* | 12/2021 | Böckem | G06F 3/0484 |
| 2022/0398864 | A1* | 12/2022 | Lu | G06V 40/20 |
| 2025/0008048 | A2* | 1/2025 | Wan | H04N 5/2624 |
| 2025/0065868 | A1* | 2/2025 | Gupta | G06V 20/58 |

FOREIGN PATENT DOCUMENTS

| | | |
|---|---|---|
| CN | 108197534 A | 6/2018 |
| CN | 110139115 A | 8/2019 |
| CN | 111107278 A | 5/2020 |
| CN | 111582208 A | 8/2020 |
| CN | 111638797 A | 9/2020 |
| CN | 111639612 A | 9/2020 |
| CN | 111639615 A | 9/2020 |
| CN | 112308977 A | 2/2021 |

OTHER PUBLICATIONS

International Search Report and Written Opinion for International Application No. PCT/CN2021/110560, mailed Nov. 3, 2021, 14 Pages.
Second Office Action issued Oct. 30, 2023 in Chinese Application No. 202011177198.2, with English translation (7 pages).
First Office Action issued Apr. 24, 2023 in Chinese Application No. 202011177198.2, with English translation (18 pages).

* cited by examiner

S110 — Identifying and tracking a landmark building in the video

S120 — Extracting and tracking a key point of a moving subject in the video, and determining a posture of the moving subject based on information of the extracted key point of the moving subject S130 — Making the key point of the moving subject correspond to the landmark building, and driving the landmark building to perform a corresponding action based on an action of the key point of the moving subject, so as to make a posture of the landmark building in the picture of the video correspond to the posture of the moving subject

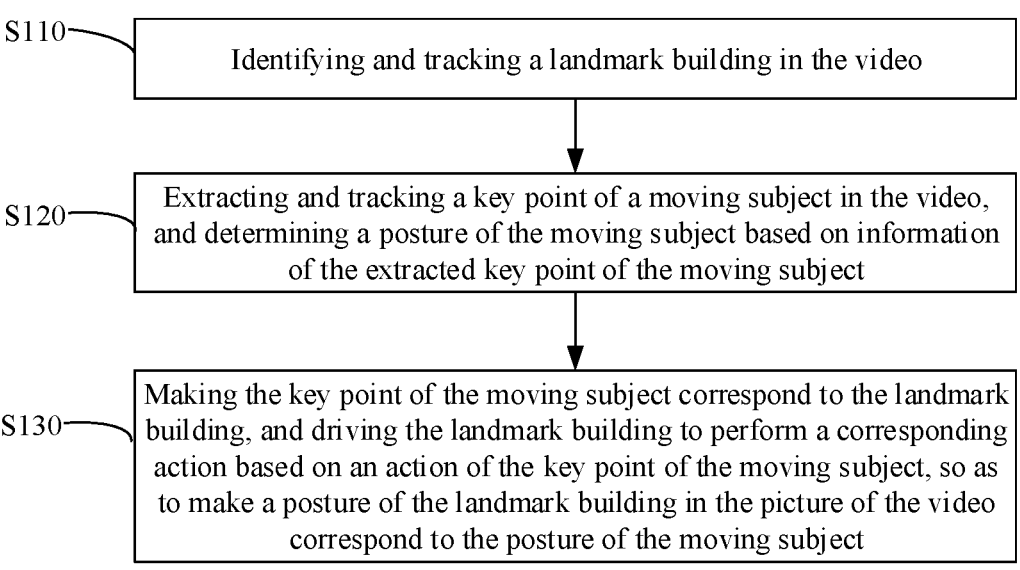

FIG. 1A

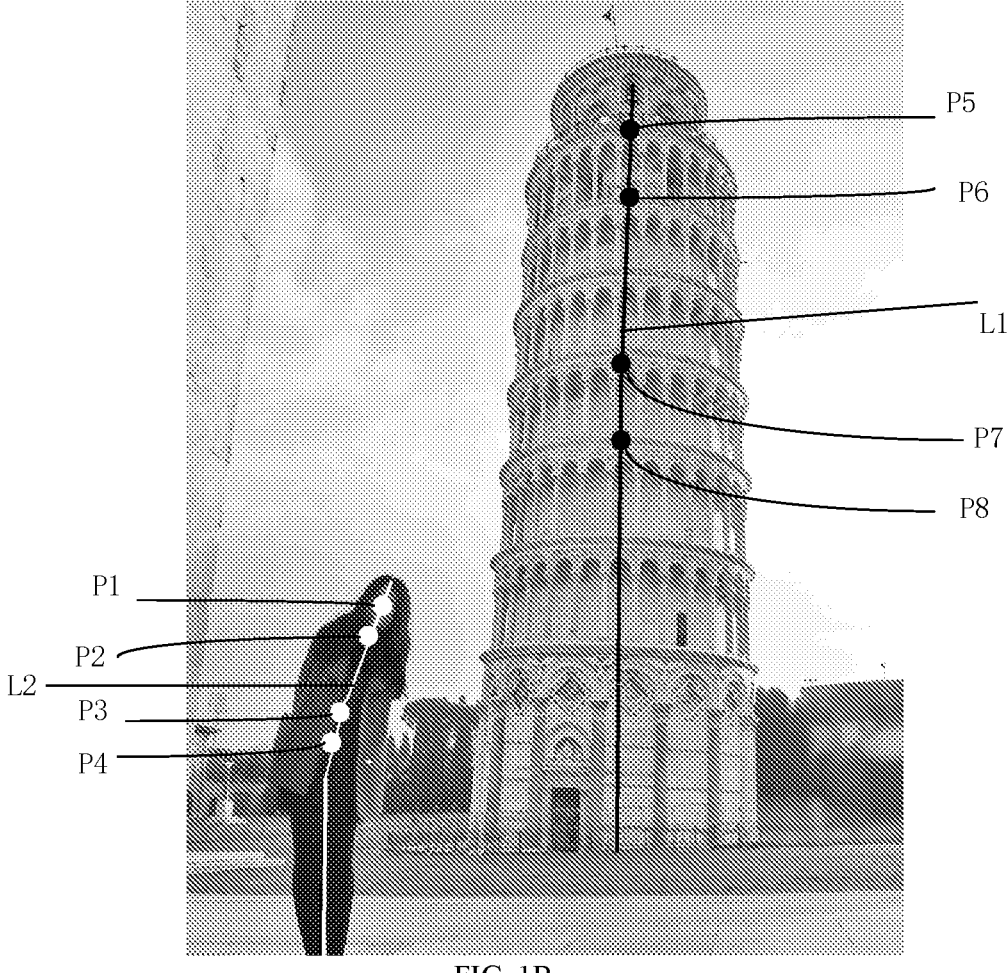

FIG. 1B

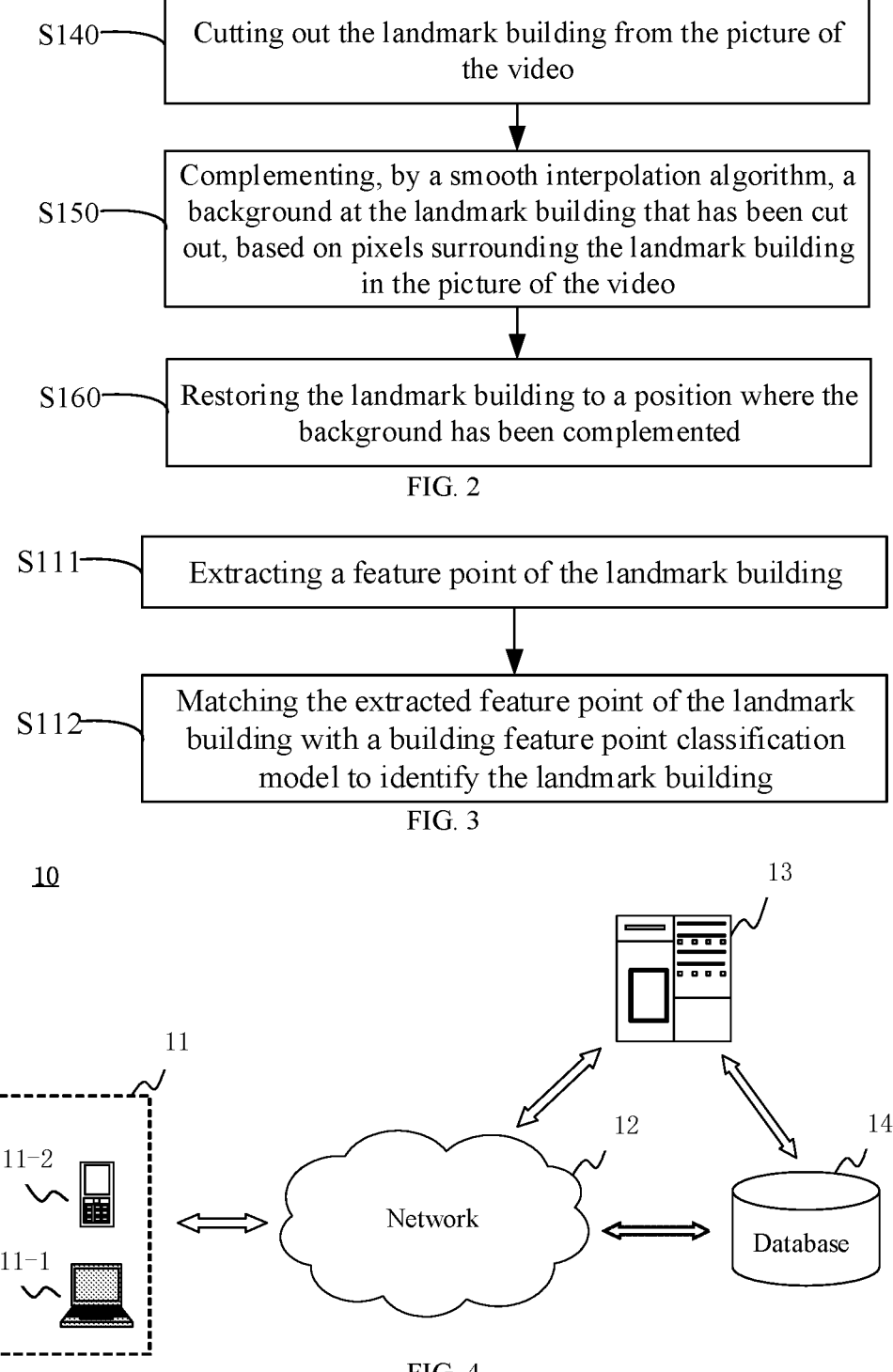

S140 — Cutting out the landmark building from the picture of the video

S150 — Complementing, by a smooth interpolation algorithm, a background at the landmark building that has been cut out, based on pixels surrounding the landmark building in the picture of the video S160 — Restoring the landmark building to a position where the background has been complemented

FIG. 2

S111 — Extracting a feature point of the landmark building

S112 — Matching the extracted feature point of the landmark building with a building feature point classification model to identify the landmark building

Network

14

Database

FIG. 4

Video Processing Apparatus
100

Identification Unit 110

Extraction Unit 120

Driving Unit 120

Video Processing Apparatus
100

Image Capturing Apparatus
140

Identification Unit 110

Extraction Unit 120

Driving Unit 120

300

1

VIDEO PROCESSING METHOD, VIDEO PROCESSING APPARATUS, AND STORAGE MEDIUM

PRIORITY INFORMATION

The present application claims the priority of Chinese Patent Application No. 202011177198.2, filed on Oct. 29, 2020 and entitled "Video Processing Method, Video Processing Apparatus, And Storage Medium", which is incorporated herein by reference in its entirety.

TECHNICAL FIELD

The embodiments of the present disclosure relate to a video processing method, a video processing apparatus, and a storage medium.

BACKGROUND

Augmented Reality (AR) technology is a technology that ingeniously fuses virtual information with the real world, which widely uses multimedia, three-dimensional (3D) modeling, real-time tracking and registration, intelligent interaction, sensing, and other technical means. After the virtual information, such as text, image, 3D model, music, and video, that is generated by the computer is simulated and applied to the real world by the AR technology, the visual information and the real world information complement with each other, thereby realizing the "augment" of the real world.

Short videos have the characteristics of strong social attributes, easy creation, and short duration, which are more in line with the fragmented content consumption habits of users in the mobile Internet times. The unique virtual and real fusion special effects of the AR technology make it have broad application prospects and unlimited expansion space in the short video field. Currently, landmark AR special effects are one of the hot spots in the short video field. The landmark AR special effects may increase the fun of shooting, prompting the users to shoot and record more actively.

SUMMARY

The existing landmark AR special effects lack interaction with the users. The effects everyone sees will be the same, which are not interesting enough, and the users cannot actively interact with the building. In view of the above problems, at least one embodiment of the present disclosure provides a video processing method, a video processing apparatus, and a storage medium, which may enhance interactions between the user and the shot landmark building, increase the fun of shooting, allow the users to obtain distinctive shooting experiences, prompt the users to shoot and record more actively, broaden the application scope of the product, and improve the market competitiveness of the product.

At least one embodiment of the present disclosure provides a video processing method. A picture of the video includes a landmark building and a moving subject. The video processing method includes: identifying and tracking the landmark building in the video; extracting and tracking a key point of the moving subject in the video, and determining a posture of the moving subject based on information of the extracted key point of the moving subject; and making the key point of the moving subject correspond to the landmark building, and driving the landmark building to perform a corresponding action based on an action of the key point of the moving subject, so as to make a posture of the landmark building in the picture of the video correspond to the posture of the moving subject.

For example, according to at least one embodiment of the present disclosure, the video processing method further includes, prior to driving the landmark building to perform the corresponding action based on the action of the key point of the moving subject: cutting out the landmark building from the picture of the video; complementing, by a smooth interpolation algorithm, a background at the landmark building that has been cut out, based on pixels surrounding the landmark building in the picture of the video; and restoring the landmark building to a position where the background has been complemented.

For example, in the video processing method according to at least one embodiment of the present disclosure, the operation of making the key point of the moving subject correspond to the landmark building, and driving the landmark building to perform the corresponding action based on the action of the key point of the moving subject includes: mapping the key point of the moving subject onto the landmark building, to make the key point of the moving subject correspond to the landmark building, so that the landmark building follows the action of the key point of the moving subject to perform the corresponding action.

For example, in the video processing method according to at least one embodiment of the present disclosure, a spine line of the moving subject is mapped onto a central axis of the landmark building.

For example, according to at least one embodiment of the present disclosure, the video processing method further includes: personifying the landmark building by means of a predefined animated material map, to make the landmark building have a feature of the moving subject.

For example, in the video processing method according to at least one embodiment of the present disclosure, the key point of the moving subject in the picture of the video is extracted by a neural network model.

For example, in the video processing method according to at least one embodiment of the present disclosure, the operation of identifying the landmark building in the picture of the video includes: extracting a feature point of the landmark building; and matching the extracted feature point of the landmark building with a building feature point classification model to identify the landmark building.

For example, in the video processing method according to at least one embodiment of the present disclosure, the operations of tracking the landmark building in the video and tracking the key point of the moving subject in the video include: detecting the landmark building and the key point of the moving subject in each frame of image in the video to track the landmark building and the key point of the moving subject.

For example, in the video processing method according to at least one embodiment of the present disclosure, in the same video, the key point of the moving subject corresponds to a plurality of landmark buildings, and the plurality of landmark buildings are driven based on the action of the key point of the moving subject to perform corresponding actions based on the action of the moving subject.

For example, in the video processing method according to at least one embodiment of the present disclosure, in the same video, key points of a plurality of moving subjects respectively correspond to a plurality of landmark buildings, and the plurality of landmark buildings are driven respectively based on a plurality of actions of the key points of the plurality of moving subjects to perform corresponding actions respectively based on the actions of the moving subjects, so as to make postures of the plurality of landmark buildings correspond to postures of the plurality of moving subject in a one-to-one correspondence.

For example, according to at least one embodiment of the present disclosure, the video processing method further includes: recording the video in real time by an image capturing apparatus, and processing each frame of image in the video in real time, so as to make the posture of the landmark building correspond to the posture of the moving subject.

For example, in the video processing method according to at least one embodiment of the present disclosure, the moving subject is a human body.

At least one embodiment of the present disclosure further provides a video processing apparatus. A picture of the video includes a landmark building and a moving subject. The video processing apparatus includes: an identification unit configured to identify and track a landmark building in the video; an extraction unit configured to extract and track a key point of a moving subject in the video, and determine a posture of the moving subject based on information of the extracted key point of the moving subject; and a driving unit configured to make the key point of the moving subject correspond to the landmark building, and drive the landmark building to perform a corresponding action based on an action of the key point of the moving subject, so as to make a posture of the landmark building in the picture of the video correspond to the posture of the moving subject.

For example, according to at least one embodiment of the present disclosure, the video processing apparatus further includes: an image capturing apparatus configured to record the video in real time, to process each frame of image in the video in real time.

For example, in the video processing apparatus according to at least one embodiment of the present disclosure, the moving subject and the landmark building are located on the same side or different sides of the image capturing apparatus.

At least one embodiment of the present disclosure further provides a video processing apparatus, including: a processor; a memory; and one or more computer program modules. The one or more computer program modules are stored in the memory and configured to be executed by the processor. The one or more computer program modules include instructions for implementing the video processing method according to any embodiment of the present disclosure.

At least one embodiment of the present disclosure further provides a storage medium non-transitorily storing computer-readable instructions, which, when executed by a computer, perform the video processing method according to any embodiment of the present disclosure.

BRIEF DESCRIPTION OF DRAWINGS

In order to explain the technical solutions of the embodiments of the present disclosure more clearly, the accompanying drawings of the embodiments will be briefly introduced below. Obviously, the drawings in the following description only relate to some embodiments of the present disclosure, rather than limit the present disclosure.

FIG. 1A is a flowchart of an example of a video processing method according to at least one embodiment of the present disclosure;

FIG. 1B is a schematic diagram of a mapping relationship between a moving subject and a landmark building according to at least one embodiment of the present disclosure;

FIG. 2 is a flowchart of a background complementation method according to at least one embodiment of the present disclosure;

FIG. 3 is a flowchart of a landmark building identification algorithm according to at least one embodiment of the present disclosure;

FIG. 4 is a system that may be used to implement a video processing method according to at least one embodiment of the present disclosure;

DESCRIPTION OF EMBODIMENTS

Figures 5, 6:
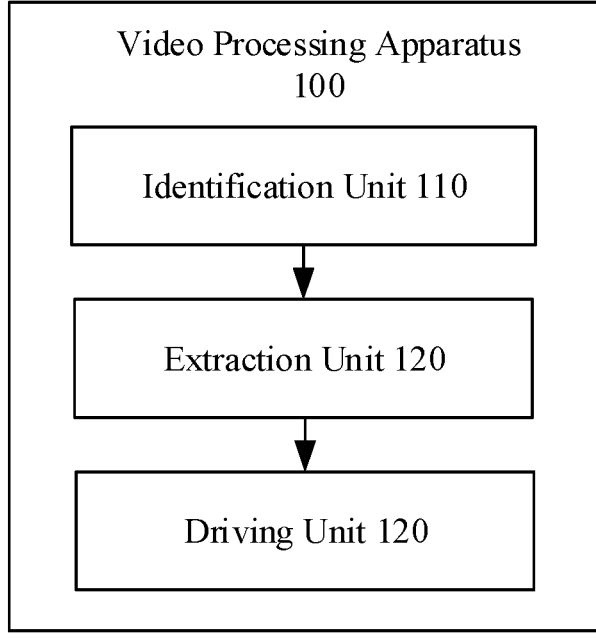
FIG. 5 is a schematic block diagram of a video processing apparatus according to at least one embodiment of the present disclosure.
FIG. 6 is a schematic block diagram of another video processing apparatus according to at least one embodiment of the present disclosure.

Embodiments of the present disclosure will be described in more detail below with reference to the accompanying drawings. While certain embodiments of the present disclosure are shown in the accompanying drawings, it should be understood that the present disclosure may be embodied in various forms, and should not be construed as being limited to the embodiments set forth herein, but rather are provided for the purpose of more thorough and complete understanding of the present disclosure. It should be understood that the accompanying drawings and the embodiments of the present disclosure are only for illustration, but are not intended to limit the protection scope of the present disclosure.

It should be understood that various steps described in the method embodiments of the present disclosure may be performed in different orders and/or in parallel. Furthermore, the method embodiments may include additional steps and/or omit the illustrated steps. The scope of the present disclosure is not limited in this regard.

As used herein, the term "comprising", "including" and variations thereof are open-ended inclusions, i.e., "including but not limited to". The term "based on" is "based at least in part on". The term "an embodiment" means "at least one embodiment", the term "another embodiment" means "at least one additional embodiment", and the term "some embodiments" means "at least some embodiments". Relevant definitions of other terms will be given in the description below.

It should be noted that the concepts such as "first", "second" mentioned in the present disclosure are only used to distinguish different devices, modules or units, and are not used to limit the order of functions performed by these devices, modules or units or interdependence thereof.

It should be noted that the modifications of "a" and "a plurality of" mentioned in the present disclosure are illustrative rather than restrictive, and the skilled in the art should understand that unless the context clearly indicates otherwise, they should be understood as "one or more", and "a plurality of" should be understood as two or more.

The names of messages or information exchanged between multiple devices in the embodiments of the present disclosure are only for illustration, and are not intended to limit the scope of these messages or information.

For example, by placing 3D materials and animations pre-designed by designers on the buildings, the landmark AR special effects may enable the buildings to have cartoon special effects, allowing the user to obtain a unique shooting experience by a high degree of combination of real and virtual effects.

However, this method lacks interactions with the user, the effects everyone sees will be the same, which are not interesting enough, and the user cannot interact with the building actively.

At least one embodiment of the present disclosure provides a video processing method. A picture of the video includes a landmark building and a moving subject. The method includes: identifying and tracking a landmark building in the video; extracting and tracking a key point of the moving subject in the video, and determining a posture of the moving subject based on information of the extracted key point of the moving subject; and making the key point of the moving subject correspond to the landmark building, and driving the landmark building to perform a corresponding action based on an action of the key point of the moving subject, so as to make a posture of the landmark building in the picture of the video correspond to the posture of the moving subject.

Some embodiments of the present disclosure also provide a video processing apparatus and a storage medium corresponding to the above-mentioned video processing method.

The video processing method, the video processing apparatus, and the storage medium according to at least one embodiment of the present disclosure may enhance the interactions between the user and the shot landmark building, increase the fun of shooting, allow the user to obtain a distinctive shooting experience, prompt the users to shoot and record more actively, broaden the application scope of the product, and improve the market competitiveness of the product.

The embodiments of the present disclosure and examples thereof will be described in detail below with reference to the accompanying drawings.

At least one embodiment of the present disclosure provides a video processing method, which, for example, may be applied to the short video field, etc., to increase the interactions between the user and the shot landmark, and increase the fun of shooting. For example, the video processing method may be implemented in software, hardware, firmware or any combination thereof, loaded and executed by a processor in a device such as a mobile phone, a digital camera, a tablet computer, a notebook computer, a desktop computer, a network server, etc., to achieve the correspondence between the posture of the landmark building and the posture of the moving subject, thereby increasing the interactions between the user and the shot landmark building.

For example, the video processing method is applicable to a computing device. The computing device includes any electronic device with computing functions, such as a mobile phone, a digital camera, a notebook computer, a tablet computer, a desktop computer, a network server, etc., which loads and executes the video processing method. The embodiments of the present disclosure are not limited thereto. For example, the computing device may include a Central Processing Unit (CPU) or a Graphics Processing Unit (GPU), a Digital Signal Processor (DSP), and other forms of processing units, storage units etc. with data processing capability and/or instruction execution capability. The computing device is also installed with an operating system, an application programming interface (e.g., Open Graphics Library (OpenGL), Metal, etc.), etc., which implements the video processing method according to the embodiments of the present disclosure by running codes or instructions. For example, the computing device may further include an output component such as a display component, such as a Liquid Crystal Display (LCD), an Organic Light Emitting Diode (OLED) display screen, a Quantum Dot Light Emitting Diode (QLED) display screen, etc., which are not limited by the embodiments of the present disclosure. For example, the display component may display the processed video. For example, in the processed video, the posture of the landmark building corresponds to the posture of the moving subject, for example, the posture of the landmark building and the posture of the moving subject are consistent or complementary, etc., thereby increasing the interactions between the user and the shot landmark building.

FIG. TA is a flowchart of an example of a video processing method according to at least one embodiment of the present disclosure. The video processing method according to at least one embodiment of the present disclosure will be described in detail below with reference to FIG. TA. For example, in some examples, as shown in FIG. TA, the video processing method includes steps S110 to S130.

In step S110, a landmark building in the video is identified and tracked.

In step S120, a key point of a moving subject in the video is extracted and tracked, and a posture of the moving subject is determined based on information of the extracted key point of the moving subject.

In step S130, the key point of the moving subject is made to correspond to the landmark building, and the landmark building is driven to perform a corresponding action based on an action of the key point of the moving subject, so as to make a posture of the landmark building in the picture of the video correspond to the posture of the moving subject.

For example, the picture of the video includes the landmark building and the moving subject. For example, in some examples, the moving subject may be a human body, or may be other movable objects such as animals, puppets, or robots, which are not limited by the embodiments of the present disclosure. Here, the "landmark building" refers to a characteristic building, a natural landscape, an artificial landscape, etc. For example, Shanghai's Oriental Pearl Tower, Beijing's CCTV Headquarters Building (commonly known as "big pants"), Guangzhou Tower (commonly known as "little waist"), Niagara Falls, the Jungfrau in the Alps, etc., can all be called a landmark building. It should be noted that the embodiments of the present disclosure include but are not limited thereto. The landmark building may be any characteristic artificial building or natural object.

For step S110, for example, the operation of tracking the landmark building in the video includes: detecting the landmark building in each frame of image in the video to track the landmark building. For example, the landmark building in each frame of image in the video is independently detected to track the landmark building in the video, so that the real-time driving of the posture of the landmark building in the video may be achieved.

For example, in some examples, the landmark building may be tracked by the visual object tracking technology, such as the generative model method and the discriminative model method etc. For example, in the discriminative model method, image features and machine learning are used. In the current frame of image, the target area (e.g., the landmark building) is taken as a positive sample and the background area is taken as a negative sample, the classifier is trained by the machine learning method, and the trained classifier is used to find the optimal area (i.e., a landmark building in the next frame of image) in the next frame of image, so as to achieve the target tracking. For the specific introduction of the target visual tracking technology, reference may be made to relevant descriptions in the art, and details thereof will not be repeated here. Of course, other image tracking algorithms may also be used in step S110, which is not limited by the embodiments of the present disclosure.

FIG. 3 is a flowchart of a landmark building identification algorithm according to at least one embodiment of the present disclosure. That is, FIG. 3 is a flowchart of an example of step S110 as shown in FIG. TA. A landmark building identification algorithm according to at least one embodiment of the present disclosure will be described in detail below with reference to FIG. 3. For example, as shown in FIG. 3, the identification algorithm includes step S111 and step S112.

In step S111, a feature point of the landmark building is extracted.

In step S112, the extracted feature point of the landmark building is matched with a building feature point classification model to identify the landmark building.

For example, for step S111, the feature point of the landmark building may be extracted from the picture of the video using a Scale-Invariant Feature Transform (SIFT) algorithm. For example, the feature point of the landmark building may be extracted from the picture of the video by performing operations included in the SIFT algorithm, such as scale space extremum detection, key point location, direction determination, and key point description etc. For example, the feature point is generally a local extremum point, such as a corner point, a boundary point, etc., which may be automatically identified by the SIFT algorithm.

For example, for step S112, the feature point of the building feature point classification model may also be extracted based on the SIFT algorithm, and the feature points are matched one by one by performing operations, such as SIFT feature generation and SIFT feature vector matching etc., using the SIFT algorithm. For example, the building with a matching degree higher than e.g., 85% may be determined as a landmark building. For a detailed description of the SIFT algorithm, reference may be made to relevant introductions in the art, and details thereof will not be repeated here. For example, the building feature point classification model may be a landmark building classification model trained based on the modeling method in the art. For the specific introduction of the modeling method, reference may be made to relevant introductions in the art, and details thereof will not be repeated here.

For example, the extraction and the matching of the feature point of the landmark building may also be achieved by Histogram of Oriented Gradients (HOG)+Support Vector Machine (SVM) or other feature extractors (e.g., the Local Binary Pattern (LBP) feature extraction algorithm, the Haar feature extraction algorithm) in combination with the classifier, which are not limited by the embodiments of the present disclosure.

For example, in some examples, the landmark building in the video is identified and tracked, so that the 3D posture of the landmark building in the world coordinate system may be restored. For example, after respective frames of images (i.e., pictures) in the video and the pre-modeled building feature point classification model are obtained, for the respective frames of images in the video, camera pose matrices of the respective frames of images in the video relative to the building feature point classification model may be calculated using the SIFT algorithm. Each frame of image in the video corresponds to a camera pose matrix. For example, the camera pose matrix may reflect the position of the camera in the world coordinate system, indicating the observation angle (the observation position and the observation view angle) of the video image including the landmark building and the human body, that is, the observation angle selected when a certain frame of image in the video is shot, so that the 3D posture of the landmark building in the world coordinate system may be restored to correspond to the 3D posture of the human body in the subsequent steps.

For step S120, for example, in some examples, the key point of the moving subject in the picture of the video are extracted by the trained neural network model. For example, when the moving subject is a human body, the key point may include various large joints of the human body, such as the head, hands, and feet, so as to obtain the 3D skeleton of the human body.

For example, in some examples, the neural network may be a convolutional neural network, a Bidirectional Long Short Term Memory Network (BLSTM), a Connectionist Temporal Classification (CTC), etc., which is not limited by the embodiments of the present disclosure. For the training method for extracting the feature point of the neural network, reference may be made to the introduction in the art, and details thereof will not be repeated here.

For example, the HOG feature extraction algorithm, the LBP feature extraction algorithm, or the Haar feature extraction algorithm may also be used to extract the key point of the moving subject; and of course, the SIFT algorithm may also be used to extract the key point of the moving subject in the video, which is not limited by the embodiments of the present disclosure. For the specific introduction of the HOG feature extraction algorithm, the LBP feature extraction algorithm, the Haar feature extraction algorithm, and the SIFT algorithm, reference may be made to the relevant descriptions in the art, and details thereof will not be repeated here.

For example, the operation of tracking the key point of the moving subject in the video includes: detecting the key point of the moving subject in each frame of image in the video to track the key point of the moving subject. For example, the key point of the moving subject in each frame of image in the video is independently detected to track the key point of the moving subject in the video, so that the posture of the moving subject may be determined in real time based on the tracked key point information in each frame of image.

For example, in some examples, the key point of the moving subject may be tracked by the visual object tracking technology, such as the generative model method, and the discriminative model method, etc. For the details thereof, reference may be made to the relevant descriptions in the art, which will not be repeated here. Of course, other image tracking algorithms may also be used in step S120, which are not limited by the embodiments of the present disclosure.

For example, after the key point of the moving subject and the information thereof are extracted and tracked from each frame of image in the video, the posture of the moving subject is determined based on the information of the extracted key point of the moving subject in each frame of image in the video. For example, the information of the key point may include the relative positional relationship, direction, etc. of the key point in each frame of image in the video; and the posture of the moving subject may include bending over, leaning back, twisting the waist, or making a Yeah gesture, etc., which are not limited by the embodiments of the present disclosure. For example, when the moving subject is a human body, it may be determined, based on the variation of the position of the key point in each frame of image in the video (e.g., the relative positional relationship, direction), etc., that the human body (e.g., the user) is in a bending over state, a leaning back state, or a twisting the waist state, so that the landmark building may be driven to perform the corresponding posture based on the posture of the human body in the subsequent steps.

For step S130, for example, the operation of making the key point of the moving subject correspond to the landmark building, and driving the landmark building to perform the corresponding action based on the action of the key point of the moving subject includes: mapping the key point of the moving subject onto the landmark building, to make the key point of the moving subject correspond to the landmark building, so that the landmark building follows the action of the key point of the moving subject to perform the corresponding action.

For example, the spine line of the moving subject is mapped onto the central axis of the landmark building. For example, as shown in FIG. 1B, when the moving subject is a human body, the spine line L2 of the human body (e.g., the spine line connected by the key points of the head P1, the neck P2, the waist P3, the hip P4, etc.) is mapped onto the corresponding feature points P5-P8 on the central axis L1 of the landmark building (e.g., the Leaning Tower of Pisa is an example of the landmark building in FIG. 1B), and the key points (not shown) of other parts (such as hands, feet, etc.) are also mapped onto other feature points of the landmark building, so that when the position and the direction of the key points of the human body change, the position and the direction of the corresponding mapped feature points on the landmark building change correspondingly, thereby driving the landmark building to follow the action of the key points of the human body to perform the corresponding action. In this way, the posture of the landmark building in the picture of the video is made to correspond to the posture of the moving subject, and thus the special effect displayed in the video is that the landmark building dances with the human body, which increases the interactions between the user and the landmark building, and the fun of the interactions. For example, the key points P1-P4 of the human body are in a one-to-one correspondence with the features P5-P8 of the landmark building in a certain proportional relationship. When any of the key points P1-P4 of the human body moves, the displacement relationship of the feature point of the landmark building corresponding to the key point moves correspondingly. For example, when the key point P1 of the human body is displaced to the lower left or lower right (e.g., the person tilts his head to the left or to the right), the feature point P5 of the landmark building corresponding to the key point P1 is also displaced to the lower left or lower right, so that the landmark building is driven to perform the corresponding action based on the action of the key point of the moving subject.

It should be noted that "making the posture of the landmark building correspond to the posture of the moving subject" includes that the posture of the landmark building is the same as that of the moving subject, that is, in the video, the landmark building dances following the dancing posture of the moving subject. For example, the landmark building bends over when the human body bends over, and the landmark building leans back when the human body leans back. Or, the posture of the landmark building is complementary to the posture of the moving subject. For example, the landmark building leans back when the human body bends over, and the landmark building twists to the right when the human body twists to the left, etc., which are not limited by the embodiments of the present disclosure.

When the landmark building moves, the pixels that were originally occluded by the landmark building may be exposed. In the embodiments of the present disclosure, the background part of the landmark building is complemented, so that when the landmark building moves, the pixels originally occluded by the landmark building may display the background behind the landmark building, thereby making the picture smoother and providing a better visual effect.

FIG. 2 is a flowchart of a background complementation method according to at least one embodiment of the present disclosure. As shown in FIG. 2, the background complementation method includes steps S140-S160.

In step S140, the landmark building is cut out from the picture of the video.

In step S150, the background at the landmark building that has been cut out is complemented by a smooth interpolation algorithm based on the pixels surrounding the landmark building in the picture of the video.

In step S160, the landmark building is restored to the position where the background has been complemented.

For step S140, for example, the landmark building may be cut out from the picture of the video using the image matting algorithm in the art. For the relevant introduction of the image matting algorithm, reference may be made to the related description in the art, and details will not be repeated here.

For step S150, for example, after the landmark building is cut out, the background at the landmark building that has been cut out may be complemented by e.g., a smooth interpolation algorithm based on the pixels surrounding the landmark building, or the background at the landmark building that has been cut out may also be complemented by other algorithms, which are not limited by the embodiments of the present disclosure. For the related introduction of the smooth interpolation algorithm, reference may be made to the related description in the art, and details will not be repeated here.

For step S160, for example, the landmark building is restored to the position where the background has been complemented, so that when the landmark building moves, the pixels that are exposed when the landmark building is shifted may display the complemented background behind the landmark building, and thus the picture may be smoother, and a better visual effect may be provided. For example, the landmark building may be restored to the position where the background has been complemented by returning the display data of the landmark building to the pixels at the position where the background has been complemented. Of course, other methods in the art may also be used, details of which are not repeated here, and are not limited by the embodiments of the present disclosure.

For example, in some examples, the complemented background is displayed in the form of a blurred background image, so that the landmark building may be mainly displayed while the picture is smoother, thereby providing a better visual display effect.

For example, in order to make the interactions between the user and the landmark building more vivid, the landmark building may also be personified, for example, making the landmark building have a face contour, hands, etc. For example, the landmark building is personified by means of a predefined animated material map, so that the landmark building has the feature of the moving subject.

For example, in some examples, one of a plurality of frames of images in the video may be selected as a preview background curtain based on the user's instruction or based on a predefined rule. For example, 3D rendering may be performed using a script of 3D modeling and animation software, such as a Maya script. For example, the Maya script is an executable script, e.g., a script written in the Maya software by a designer designing AR special effects of the landmark building, or a script provided in the Maya software, which is not limited by the embodiments of the present disclosure. Since the landmark building model may be a 3D model created in the Maya software, 3D rendering using the Maya script may simplify the operations and improve the efficiency. It should be noted that, when the landmark building model is a 3D model established in other software, 3D rendering may be performed by a script in the software accordingly, which may be determined as required, and not limited by the embodiments of the present disclosure.

For example, in some examples, if a plurality of landmark buildings are pre-modeled and can be identified, in the same video, the key point of a moving subject may be made to correspond to the plurality of landmark buildings, and the plurality of landmark buildings may be driven based on the action of the key point of the moving subject to perform a corresponding action based on the action of the moving subject. That is, the plurality of landmark buildings are driven to dance at the same time by, for example, the 3D posture of one person.

For example, in some other examples, in the same video, key points of a plurality of moving subjects respectively are made to correspond to a plurality of landmark buildings, and the plurality of landmark buildings are driven respectively based on a plurality of actions of the key points of the plurality of moving subjects to perform corresponding actions respectively based on the actions of the moving subjects, so as to make postures of the plurality of landmark buildings correspond to the postures of the plurality of moving subject in a one-to-one correspondence. That is, for example, the 3D postures of multiple people can be identified to drive multiple buildings to dance correspondingly at the same time. For example, the key points of the moving subject may be mapped onto the plurality of landmark buildings sequentially according to the order of the respective frames of images in the video, so that in the same video, the plurality of moving subjects drive the plurality of landmark buildings to dance, respectively.

For example, in some examples, the video may be recorded in real time by an image capturing apparatus, and each frame of image in the video may be processed in real time, so that the posture of the landmark building is made to correspond to the posture of the moving subject. For example, the moving subject and the landmark building may be located on the same side or on different sides of the image capturing apparatus.

For example, when the image capturing apparatus is implemented as a camera of a mobile phone, the human body and the landmark building may be in the same scene, for example, both are in the scene captured by the rear camera; or the human body and the landmark building may also be in different scenes, for example, the human body is in the scene captured by the front camera, while the landmark building is in the scene captured by the rear camera, which is not limited by the embodiments of the present disclosure.

The video processing method according to at least one embodiment of the present disclosure may increase interactions between the user and the shot landmark building, increase the fun of shooting, allow the users to obtain distinctive shooting experiences, prompt the users to shoot and record more actively, broaden the application scope of the product, and improve the market competitiveness of the product.

It should be noted that, in the embodiments of the present disclosure, the processes of the video processing methods according to various embodiments of the present disclosure may include more or less operations, and these operations may be performed sequentially or in parallel. Although the process of the video processing method as described above includes a plurality of operations in a specific order, it should be clearly understood that the sequence of the plurality of operations is not limited. The above-described video processing method may be performed once, or may be performed multiple times according to a predetermined condition.

FIG. 4 is a system that may be used to implement a video processing method according to at least one embodiment of the present disclosure. As shown in FIG. 4, the system 10 may include a user terminal 11, a network 12, a server 13, and a database 14. For example, the system 10 may be used to implement the video processing method according to any embodiment of the present disclosure.

The user terminal 11 is, for example, a computer 11-1 or a mobile phone 11-2. It may be understood that the user terminal 11 may be any other type of electronic device capable of performing data processing, which may include, but not limited to, a desktop computer, a notebook computer, a tablet computer, a smart phone, a smart home device, a wearable device, an in-vehicle electronic device, a monitoring device, etc. The user terminal may also be any equipment, such as a vehicle, a robot, provided with an electronic device. The embodiments of the present disclosure do not limit the hardware configuration or software configuration (e.g., the type or version of the operating system (e.g., Windows, MacOS, etc.) of the user terminal, and the like.

The user may operate on the application installed on the user terminal 11 or the website logged in on the user terminal 11, the application or the website transmits the user behavior data to the server 13 via the network 12, and the user terminal 11 may also receive data transmitted by the server 13 via the network 12. The user terminal 11 may implement the video processing method according to the embodiments of the present disclosure by running a sub-program or a sub-thread.

For example, in some embodiments, the processing unit of the user terminal 11 may be used to execute the video processing method according to the embodiments of the present disclosure. In some implementations, the user terminal 11 may execute the scene switching method using a built-in application in the user terminal 11. In some other implementations, the user terminal 11 may execute the video processing method according to at least one embodiment of the present disclosure by invoking an application stored outside the user terminal 11.

In some other embodiments, the user terminal 11 transmits the obtained video to the server 13 via the network 12, and the server 13 executes the video processing method. In some implementations, the server 13 may execute the video processing method using a built-in application in the server.

In some other implementations, the server 13 may execute the video processing method by invoking an application stored outside the server 13.

The network 12 may be a single network, or a combination of at least two different networks. For example, the network 12 may include, but not limited to, one or a combination of a local area network, a wide area network, a public network, a private network, and the like.

The server 13 may be a single server or a server cluster, and each server in the cluster is connected through a wired or wireless network. A server cluster may be centralized, such as a data center, or distributed. The server 13 may be local or remote.

The database 14 may generally refer to a device with a storage function. The database 14 is mainly used to store various data used, generated and output from the operation of the user terminal 11 and the server 13. The database 14 may be local or remote. The database 14 may include various memories, such as a Random Access Memory (RAM), a Read Only Memory (ROM), and the like. The storage devices mentioned above are just some examples, and the storage devices that may be used by the system are not limited thereto.

The database 14 may be connected or communicated with the server 13 or a part thereof via the network 12, or directly connected or communicated with the server 13, or a combination of the both.

In some embodiments, the database 14 may be a standalone device. In some other embodiments, the database 14 may be integrated into at least one of the user terminal 11 or the server 13. For example, the database 14 may be arranged on the user terminal 11 or on the server 13. For another example, the database 14 may be distributed, a part of which is arranged on the user terminal 11 and the other part of which is arranged on the server 14.

For example, a model database may be deployed on database 14. When it is necessary to obtain a building feature point classification model or a neural network model for extracting key points of the human body, the user terminal 11 accesses the database 14 via the network 12, and obtains the building feature point classification model or the neural network model for extracting key points of the human body stored in the database 14 via the network 12. The embodiments of the present disclosure do not limit the type of the database, for example, it may be a relational database or a non-relational database.

FIG. 5 is a schematic block diagram of a video processing apparatus according to at least one embodiment of the present disclosure. For example, in the example shown in FIG. 5, the video processing apparatus 100 includes an identification unit 110, an extraction unit 120, and a driving unit 130. For example, these units may be implemented by hardware (e.g., circuit) modules, software modules, or any combination of the both. The following embodiments are the same, and details of which will not be repeated here. For example, these units may be implemented by a Central Processing Unit (CPU), a Graphics Processing Unit (GPU), a Tensor Processing Unit (TPU), a Field Programmable Gate Array (FPGA), or other forms of processing units with data processing capability and/or instruction execution capability, and corresponding computer instructions.

The identification unit 110 is configured to identify and track a landmark building in the video. For example, the identification unit 110 may implement step S110, and reference may be made to the relevant description of step S110 for its specific implementation, which will not be repeated here.

The extraction unit 120 is configured to extract and track a key point of a moving subject in the video, and determine a posture of the moving subject based on information of the extracted key point of the moving subject. For example, the extraction unit 120 may implement step S120, and reference may be made to the relevant description of step S120 for its specific implementation, which will not be repeated here.

The driving unit 130 is configured to make the key point of the moving subject correspond to the landmark building, and drive the landmark building to perform a corresponding action based on an action of the key point of the moving subject, so as to make a posture of the landmark building in the picture of the video correspond to the posture of the moving subject. For example, the driving unit 130 may implement step S130, and reference may be made to the relevant description of step S130 for its specific implementation, which will not be repeated here.

FIG. 6 is a schematic block diagram of another video processing apparatus according to at least one embodiment of the present disclosure. For example, as shown in FIG. 6, on the basis of the example shown in FIG. 5, the video processing apparatus 100 further includes an image capturing apparatus 140.

For example, the image capturing apparatus 140 is configured to record the video in real time, to process each frame of image in the video in real time. For example, the image capturing apparatus may be implemented as a camera, or other devices including a Complementary Metal Oxide Semiconductor (CMOS) sensor, a Charge Coupled Device (CCD) sensor, etc., which are not limited by the embodiments of the present disclosure.

For example, the moving subject and the landmark building may be located on the same side or on different sides of the image capturing apparatus 140.

For example, when the image capturing apparatus is implemented as a camera of a mobile phone, for example, the human body and the landmark building may be in the same scene, for example, both are in the scene captured by the rear camera; or the human body and the landmark building may be in different scenes, for example, the human body is in the scene captured by the front camera, while the landmark building is in the scene captured by the rear camera, which is not limited by the embodiments of the present disclosure.

It should be noted that, in the embodiments of the present disclosure, the video processing apparatus 100 according to various embodiments of the present disclosure may include more or less circuits or units, and the connection relationships between various circuits or units are not limited, but may be determined as required. The specific structure of each circuit is not limited, which may be composed of analog devices, digital chips, or other suitable ways according to circuit principles.

Figure 7:
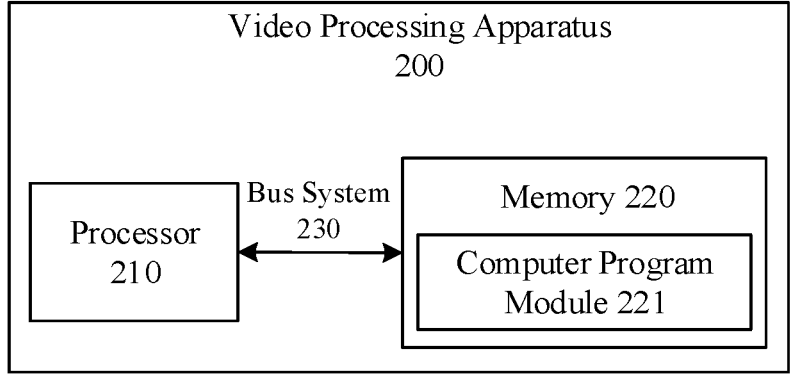
FIG. 7 is a schematic block diagram of still another video processing apparatus according to at least one embodiment of the present disclosure.

FIG. 7 is a schematic block diagram of still another video processing apparatus according to at least one embodiment of the present disclosure. For example, as shown in FIG. 7, the video processing apparatus 200 includes a processor 210, a memory 220, and one or more computer program modules 221.

For example, the processor 210 and the memory 220 are connected via a bus system 230. For example, the one or more computer program modules 221 are stored in the memory 220. For example, the one or more computer program modules 221 include instructions for performing the video processing method according to any of the embodiments of the present disclosure. For example, instructions in the one or more computer program modules 221 may be executed by the processor 210. For example, the bus system 230 may be a common serial or parallel communication bus, etc., which is not limited by the embodiment of the present disclosure.

For example, the processor 210 may be a Central Processing Unit (CPU), a Digital Signal Processor (DSP), a Graphics Processing Unit (GPU), or other forms of processing units with data processing capability and/or instruction execution capability, or may be a general-purpose processor or a special purpose processor, which may control other components in the video processing apparatus 200 to perform desired functions.

The memory 220 may include one or more computer program products, which may include various forms of computer-readable storage media, such as volatile memory and/or non-volatile memory. The volatile memory may include, for example, a Random Access Memory (RAM) and/or a cache memory (cache), etc. The non-volatile memory may include, for example, a Read Only Memory (ROM), a hard disk, a flash memory, and the like. One or more computer program instructions may be stored in the computer-readable storage medium, and the processor 210 may execute the program instructions to implement the functions (implemented by the processor 210) in the embodiments of the present disclosure and/or other desired functions, such as video processing methods, etc. Various applications and various data may also be stored in the computer-readable storage medium, such as the key points of the moving subject, the feature points of the landmark building, and various data used and/or generated by the applications.

It should be noted that, for the sake of clarity and conciseness, the embodiment of the present disclosure does not provide all the components of the video processing apparatus 200. In order to implement the necessary functions of the video processing apparatus 200, the skilled in the art may provide and arrange other components that are not shown according to specific requirements, which are not limited by the embodiments of the present disclosure.

Regarding the technical effects of the video processing apparatus 100 and the video processing apparatus 200 in different embodiments, reference may be made to the technical effects of the video processing method according to the embodiments of the present disclosure, details of which will not be repeated here.

Figure 8:
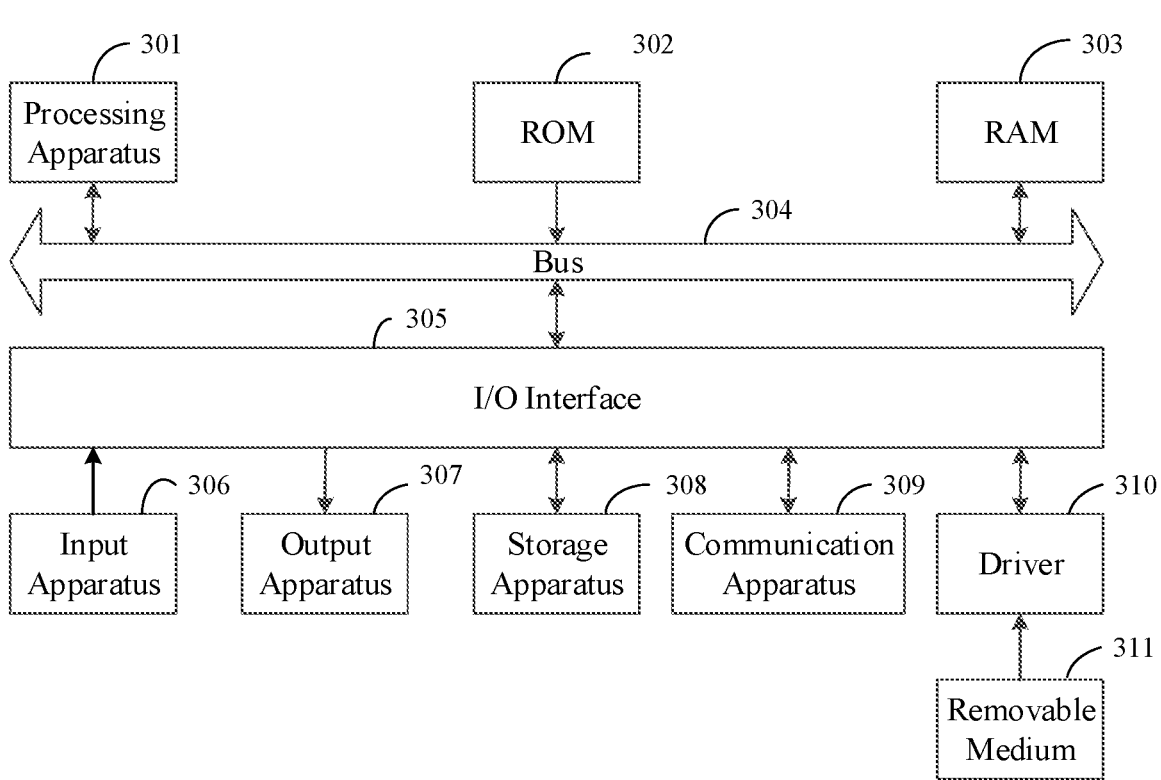
FIG. 8 is a schematic structural diagram of an electronic device according to at least one embodiment of the present disclosure.

The video processing apparatus 100 and the video processing apparatus 200 may be used in various suitable electronic devices (e.g., the terminal devices or the server in FIG. 4). FIG. 8 is a schematic structural diagram of an electronic device according to at least one embodiment of the present disclosure. The terminal devices in the embodiments of the present disclosure may include, but not limited to, a mobile terminal, such as a mobile phone, a digital camera, a notebook computer, a digital broadcast receiver, a Personal Digital Assistant (PDA), a Tablet computer (PAD), a Portable Multimedia Player (PMP), in-vehicle terminal (such as an in-vehicle navigation terminal), and a stationary terminal, such as a digital TV, a desktop computer, and the like. The electronic device shown in FIG. 8 is only an example, and should not impose any limitation on the function and scope of use of the embodiments of the present disclosure.

For example, as shown in FIG. 8, in some examples, the electronic device 300 includes a processing apparatus (e.g., a central processing unit, a graphics processing unit, etc.) 301, which may perform various appropriate actions and processes based on the programs stored in a Read Only Memory (ROM) 302 or loaded into a Random Access Memory (RAM) 303 from a storage apparatus 308. In the RAM 303, various programs and data necessary for the operations of the computer system are also stored. The processing apparatus 301, the ROM 302, and the RAM 303 are connected to each other through a bus 304. An input/output (I/O) interface 305 is also connected to the bus 304.

For example, the following components may be connected to the I/O interface 305: an input apparatus 306, including, for example, a touch screen, a touchpad, a keyboard, a mouse, a camera, a microphone, an accelerometer, a gyroscope, etc.; an output apparatus 307, including, for example, a Liquid Crystal Display (LCD), a speaker, a vibrator, etc.; a storage apparatus 308, including, for example, a magnetic tape, a hard disk, etc.; and a communication apparatus 309, including a network interface card, such as a LAN card, a modem, and the like. The communication apparatus 309 may allow the electronic device 300 to perform wireless or wired communication with other devices to exchange data, and to perform communication processing via a network such as the Internet. A driver 310 is also connected to the I/O interface 305 as required. A removable medium 311, such as a magnetic disk, an optical disk, a magneto-optical disk, a semiconductor memory, etc., is mounted on the driver 310 as required, so that a computer program read therefrom is installed into the storage apparatus 309 as required. While FIG. 8 shows the electronic device 300 including various apparatuses, it should be understood that not all of the illustrated apparatuses are required to be implemented or included. More or fewer apparatuses may be implemented or included alternatively.

For example, the electronic device 300 may further include a peripheral interface (not shown) and the like. The peripheral interface may be various types of interfaces, such as a USB interface, a lightning interface, and the like. The communication apparatus 309 may communicate with the network, such as the Internet, an intranet, and/or a wireless network such as a cellular telephone network, a wireless Local Area Network (LAN), and/or a Metropolitan Area Network (MAN), and other devices by wireless communication. The wireless communication may use any of a variety of communication standards, protocols and technologies, including but not limited to Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g. based on IEEE 802.11a, IEEE 802.11b, IEEE 802.11g and/or IEEE 802.11n standards), Voice over Internet Protocols (VoIP), Wi-MAX, protocols for email, instant messaging and/or Short Message Service (SMS), or any other suitable communication protocols.

For example, the electronic device may be any device such as a mobile phone, a tablet computer, a notebook computer, an e-book, a game console, a television, a digital photo frame, a navigator, etc., or any combination of electronic devices and hardware, which are not limited by the embodiments of the present disclosure.

For example, the processes described above with reference to the flowcharts may be implemented as the computer software program according to the embodiments of the present disclosure. For example, the embodiments of the present disclosure include a computer program product including a computer program carried on a non-transitory computer readable medium, the computer program containing program codes for performing the methods illustrated in the flowcharts. In such embodiments, the computer program may be downloaded and installed from the network via the communication apparatus 309, or installed from the storage apparatus 308, or installed from the ROM 302. When the computer program is executed by the processing apparatus 301, the above-mentioned video processing functions defined in the methods of the embodiments of the present disclosure are executed.

It should be noted that the computer-readable medium mentioned above in the present disclosure may be a computer-readable signal medium or a computer-readable storage medium, or any combination of the both. The computer-readable storage medium may be, for example, but not limited to, an electrical, magnetic, optical, electromagnetic, infrared, or semiconductor system, apparatus or device, or any combination thereof. More specific examples of the computer readable storage medium may include, but are not limited to, an electrical connection with one or more wires, a portable computer disk, a hard disk, a Random Access Memory (RAM), a Read Only Memory (ROM), an Erasable Programmable Read Only Memory (EPROM or flash memory), optical fiber, a portable Compact-Disk Read Only Memory (CD-ROM), an optical storage device, a magnetic storage device, or any suitable combination thereof. In the embodiments of the present disclosure, the computer-readable storage medium may be any tangible medium that contains or stores a program that can be used by or in conjunction with an instruction execution system, apparatus, or device. In the embodiments of the present disclosure, the computer-readable signal medium may include a data signal in baseband or propagated as a part of a carrier wave, carrying computer-readable program codes therein. Such propagated data signals may take a variety of forms, including but not limited to electromagnetic signals, optical signals, or any suitable combination thereof. A computer-readable signal medium may also be any other computer-readable storage medium that may transmit, propagate, or transport the program to be used by or in conjunction with the instruction execution system, apparatus, or device. The program codes embodied on the computer readable medium may be transmitted in any suitable medium including, but not limited to, an electrical wire, an optical fiber cable, a Radio Frequency (RF), etc., or any suitable combination thereof.

In some embodiments, the client and the server may use any currently known or future developed network protocol, such as HyperText Transfer Protocol (HTTP), to communicate, and may be interconnected with digital data communication (e.g., communication network) in any form or medium. Examples of the communication network include a Local Area Network ("LAN"), a Wide Area Networks ("WAN"), the Internet (e.g., the Internet), and a peer-to-peer network (e.g., an ad hoc peer-to-peer network), as well as any currently known or future developed network.

The above-mentioned computer-readable medium may be contained in the above-mentioned electronic device; or may exist alone without being assembled into the electronic device.

The above-mentioned computer-readable medium carries one or more programs, which, when being executed by the electronic device, cause the electronic device to: identify and track the landmark building in the video; extract and track a key point of the moving subject in the video, and determine a posture of the moving subject based on information of the extracted key point of the moving subject; and make the key point of the moving subject correspond to the landmark building, and drive the landmark building to perform a corresponding action based on an action of the key point of the moving subject, so as to make a posture of the landmark building in the picture of the video correspond to the posture of the moving subject.

The computer program codes for performing the operations of the present disclosure may be written in one or more programming languages, including but not limited to object-oriented programming languages, such as Java, Smalltalk, C++, and conventional procedural programming languages, such as the C language or similar programming languages. The program codes may execute entirely on the user's computer, partly on the user's computer, as a stand-alone software package, partly on the user's computer and partly on a remote computer, or entirely on the remote computer or server. In a case of a remote computer being involved, the remote computer may be connected to the user's computer through any kind of network, including a Local Area Network (LAN) or a Wide Area Network (WAN), or may be connected to an external computer (e.g., using an Internet service provider via the Internet connection).

The functions described herein above may be performed, at least in part, by one or more hardware logic components. For example, exemplary types of hardware logic components that may be used include, but not limited to, Field Programmable Gate Array (FPGA), Application Specific Integrated Circuit (ASIC), Application Specific Standard Product (ASSP), System-on-Chip (SOC), Complex Programmable Logic Device (CPLD), etc.

In various embodiments of the present disclosure, a machine-readable medium may be a tangible medium that may contain or store a program to be used by or in conjunction with the instruction execution system, apparatus or device. The machine-readable medium may be a machine-readable signal medium or a machine-readable storage medium. The machine-readable media may include, but not limited to, electronic, magnetic, optical, electromagnetic, infrared, or semiconductor systems, apparatuses, or devices, or any suitable combination thereof. More specific examples of the machine-readable storage medium may include an electrical connection with one or more wires, a portable computer disk, a hard disk, a Random Access Memory (RAM), a Read Only Memory (ROM), an Erasable Programmable Read Only Memory (EPROM or flash memory), optical fiber, a portable Compact-Disk Read Only Memory (CD-ROM), an optical storage device, a magnetic storage device, or any suitable combination thereof.

Figure 9:
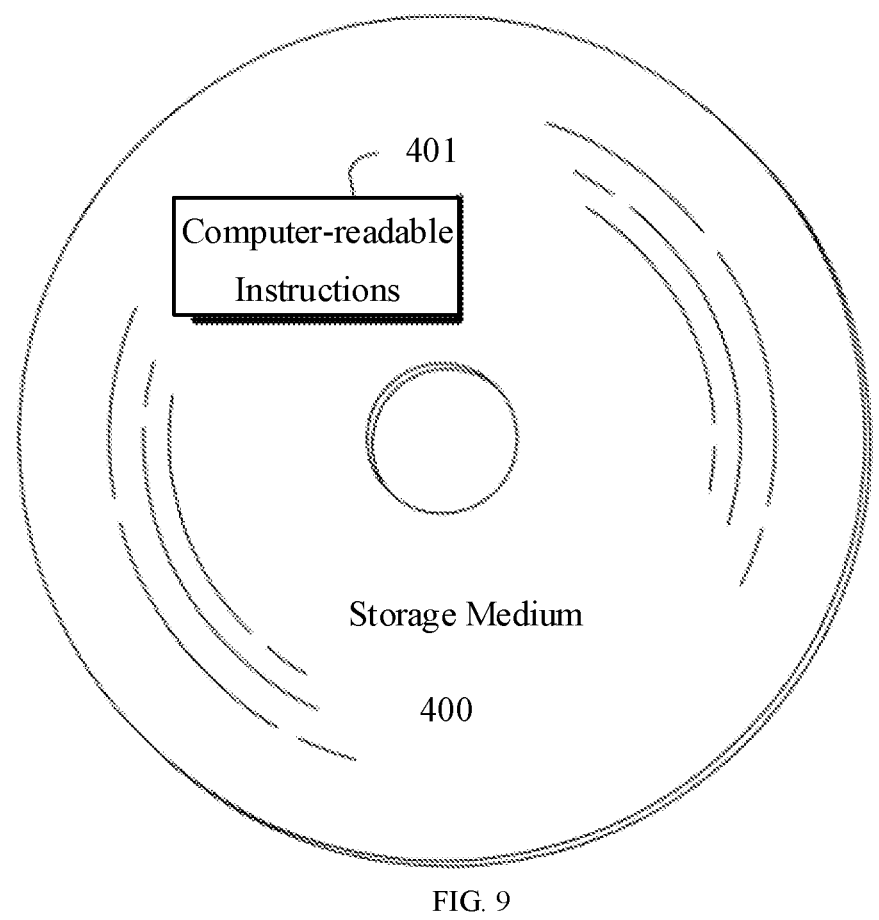
FIG. 9 is a schematic diagram of a storage medium according to at least one embodiment of the present disclosure.

At least one embodiment of the present disclosure also provides a storage medium. FIG. 9 is a schematic diagram of a storage medium according to at least one embodiment of the present disclosure. For example, as shown in FIG. 9, the storage medium 400 stores computer-readable instructions 401 non-transiently, which, when executed by a computer (including a processor), may perform the video processing method according to any of the embodiments of the present disclosure.

For example, the storage medium may be any combination of one or more computer-readable storage media. For example, one computer-readable storage medium contains computer-readable program codes for identifying and tracking a landmark building in video, and another computer-readable storage medium contains computer readable program codes for extracting and tracking the key point of a moving subject in the video. For example, when the program codes are read by the computer, the computer may execute the program codes stored in the computer storage medium to perform, for example, the video processing method according to any of the embodiments of the present disclosure.

For example, the storage medium may include a memory card of a smartphone, a storage component of a tablet computer, a hard disk of a personal computer, a Random Access Memory (RAM), a Read Only Memory (ROM), an Erasable Programmable Read Only Memory (EPROM), a portable Compact Disk-Read Only Memory (CD-ROM), a flash memory, or any combination thereof, and may also be other suitable storage media.

It should be noted that:

(1) in the drawings of the embodiments of the present disclosure, only the structures involved in the embodiments of the present disclosure are involved, and other structures may refer to general designs; and (2) the embodiments and the features in the embodiments of the present disclosure may be combined with each other without conflict to obtain new embodiments.

While the specific embodiments of the present disclosure have been described above, the scope of the present disclosure is not limited to these embodiments. The scope of present disclosure is defined by the claims as attached.

What is claimed is:

1. A video processing method, wherein a picture of the video comprises a landmark building and a moving subject, the video processing method comprising:

identifying and tracking the landmark building in the video;

extracting and tracking a key point of the moving subject in the video, and determining a posture of the moving subject based on information of the extracted key point of the moving subject;

making the key point of the moving subject correspond to the landmark building, and driving the landmark building to perform a corresponding action based on an action of the key point of the moving subject, so as to make a posture of the landmark building in the picture of the video correspond to the posture of the moving subject, and personifying the landmark building by means of a predefined animated material map, to make the landmark building have a feature of the moving subject.

2. The video processing method of claim 1, further comprising, prior to driving the landmark building to perform the corresponding action based on the action of the key point of the moving subject:

cutting out the landmark building from the picture of the video;

complementing, by a smooth interpolation algorithm, a background at the landmark building that has been cut out, based on pixels surrounding the landmark building in the picture of the video; and restoring the landmark building to a position where the background has been complemented.

3. The video processing method of claim 1, wherein said making the key point of the moving subject correspond to the landmark building, and driving the landmark building to perform the corresponding action based on the action of the key point of the moving subject comprises:

mapping the key point of the moving subject onto the landmark building, to make the key point of the moving subject correspond to the landmark building, so that the landmark building follows the action of the key point of the moving subject to perform the corresponding action.

4. The video processing method of claim 3, wherein a spine line of the moving subject is mapped onto a central axis of the landmark building.

5. The video processing method of claim 1, wherein the key point of the moving subject in the picture of the video is extracted by a neural network model.

6. The video processing method of claim 1, wherein said identifying the landmark building in the picture of the video comprises:

extracting a feature point of the landmark building; and matching the extracted feature point of the landmark building with a building feature point classification model to identify the landmark building.

7. The video processing method of claim 1, wherein said tracking the landmark building in the video and said tracking the key point of the moving subject in the video comprise:

detecting the landmark building and the key point of the moving subject in each frame of image in the video to track the landmark building and the key point of the moving subject.

8. The video processing method of claim 1, wherein in the same video, the key point of the moving subject is made to correspond to a plurality of landmark buildings, and the plurality of landmark buildings are driven based on the action of the key point of the moving subject to perform a corresponding action based on the action of the moving subject.

9. The video processing method of claim 1, wherein in the same video, key points of a plurality of moving subjects are made to respectively correspond to a plurality of landmark buildings, and the plurality of landmark buildings are driven respectively based on a plurality of actions of the key points of the plurality of moving subjects to perform corresponding actions respectively based on the actions of the moving subjects, so as to make postures of the plurality of landmark buildings correspond to postures of the plurality of moving subjects in a one-to-one correspondence.

10. The video processing method of claim 1, further comprising:

recording the video in real time by an image capturing apparatus, and processing each frame of image in the video in real time, so as to make the posture of the landmark building correspond to the posture of the moving subject.

11. The video processing method of claim 1, wherein the moving subject is a human body.

12. A video processing apparatus, comprising:

a processor;

a memory; and one or more computer program modules, wherein the one or more computer program modules are stored in the memory and configured to be executed by the processor, the one or more computer program modules comprising instructions to perform:

identifying and tracking a landmark building in the video, a picture of the video comprising the landmark building and a moving subject;

extracting and tracking a key point of the moving subject in the video, and determining a posture of the moving subject based on information of the extracted key point of the moving subject;

making the key point of the moving subject correspond to the landmark building, and driving the landmark building to perform a corresponding action based on an action of the key point of the moving subject, so as to make a posture of the landmark building in the picture of the video correspond to the posture of the moving subject, and personifying the landmark building by means of a pre-defined animated material map, to make the landmark building have a feature of the moving subject.

13. The video processing apparatus of claim 12, the one or more computer program modules comprising instructions further to perform, prior to driving the landmark building to perform the corresponding action based on the action of the key point of the moving subject:

cutting out the landmark building from the picture of the video;

complementing, by a smooth interpolation algorithm, a background at the landmark building that has been cut out, based on pixels surrounding the landmark building in the picture of the video; and restoring the landmark building to a position where the background has been complemented.

14. The video processing apparatus of claim 12, wherein said making the key point of the moving subject correspond to the landmark building, and driving the landmark building to perform the corresponding action based on the action of the key point of the moving subject comprises:

mapping the key point of the moving subject onto the landmark building, to make the key point of the moving subject correspond to the landmark building, so that the landmark building follows the action of the key point of the moving subject to perform the corresponding action.

15. The video processing apparatus of claim 14, wherein a spine line of the moving subject is mapped onto a central axis of the landmark building.

16. The video processing apparatus of claim 12, wherein the key point of the moving subject in the picture of the video is extracted by a neural network model.

17. The video processing apparatus of claim 12, wherein said identifying the landmark building in the picture of the video comprises:

extracting a feature point of the landmark building; and matching the extracted feature point of the landmark building with a building feature point classification model to identify the landmark building.

18. A storage medium non-transitorily storing computer-readable instructions, which, when executed by a computer, perform:

identifying and tracking a landmark building in the video, a picture of the video comprising the landmark building and a moving subject;

extracting and tracking a key point of the moving subject in the video, and determining a posture of the moving subject based on information of the extracted key point of the moving subject;

making the key point of the moving subject correspond to the landmark building, and driving the landmark building to perform a corresponding action based on an action of the key point of the moving subject, so as to make a posture of the landmark building in the picture of the video correspond to the posture of the moving subject, and personifying the landmark building by means of a pre-defined animated material map, to make the landmark building have a feature of the moving subject.

* * * * *